(12) United States Patent
Klotzbuecher et al.

(10) Patent No.: US 11,307,300 B2
(45) Date of Patent: Apr. 19, 2022

(54) VEHICLE RADAR SYSTEM

(71) Applicants: Dirk Klotzbuecher, Mainstockheim (DE); Christian Schwert, Hassfurt (DE)

(72) Inventors: Dirk Klotzbuecher, Mainstockheim (DE); Christian Schwert, Hassfurt (DE)

(73) Assignee: VEONEER SWEDEN AB, Vargarda (SE)

( * ) Notice: Subject to any disclaimer, the term of this patent is extended or adjusted under 35 U.S.C. 154(b) by 852 days.

(21) Appl. No.: 15/779,995

(22) PCT Filed: Nov. 30, 2016

(86) PCT No.: PCT/EP2016/079270
§ 371 (c)(1),
(2) Date: May 30, 2018

(87) PCT Pub. No.: WO2017/093314
PCT Pub. Date: Jun. 8, 2017

(65) Prior Publication Data
US 2018/0364330 A1 Dec. 20, 2018

(30) Foreign Application Priority Data
Dec. 1, 2015 (EP) .................................. 15197282

(51) Int. Cl.
*G01S 13/42* (2006.01)
*G01S 13/931* (2020.01)
(Continued)

(52) U.S. Cl.
CPC .............. *G01S 13/42* (2013.01); *G01S 7/415* (2013.01); *G01S 13/931* (2013.01);
(Continued)

(58) Field of Classification Search
CPC ........ G01S 7/415; G01S 13/42; G01S 13/584; G01S 13/931; G01S 2013/9315; G01S 2013/93274; G01S 13/583
See application file for complete search history.

(56) References Cited

U.S. PATENT DOCUMENTS 7,385,550 B2 6/2008 Winter et al.
7,545,313 B2 6/2009 Okamura et al.
(Continued)

FOREIGN PATENT DOCUMENTS

DE 10 2013 019804 A1 5/2015
EP 1 770 410 B1 5/2017
(Continued)

OTHER PUBLICATIONS

International Search Report and Written Opinion of PCT/EP2016/079270, dated Mar. 8, 2017.

*Primary Examiner* — Matthew M Barker
(74) *Attorney, Agent, or Firm* — Dickinson Wright PLLC

(57) ABSTRACT

A vehicle radar system (3) including at least one transceiver arrangement (7) arranged to generate, transmit and receive reflected radar signals (4, 5) where the transmitted radar signals (4) have been reflected by an object (6 and 8). The radar system (3) is arranged to provide azimuth angle (θ) and radial velocity ($v_r$) for a plurality of measurement points (9) at such objects (6 and 8). The radar system (3) is arranged to calculate a difference between a minimum radial velocity ($V_{min}'$, $V_{min}''$) and a maximum radial velocity ($V_{max}'$, $V_{max}''$) for the measurement points (9) for a plurality of azimuth angle intervals, and to select those azimuth angle intervals ($\Delta\theta_A$, $\Delta\theta_B$) where the difference exceeds a certain threshold.

4 Claims, 4 Drawing Sheets

(51) Int. Cl.
  *G01S 7/41* (2006.01)
  *G01S 13/58* (2006.01)
(52) U.S. Cl.
  CPC ........... *G01S 13/583* (2013.01); *G01S 13/584* (2013.01); *G01S 2013/9315* (2020.01); *G01S 2013/93274* (2020.01)

(56) References Cited

U.S. PATENT DOCUMENTS

| | | |
|---|---|---|
| 7,598,904 B2 | 10/2009 | Klotzbuecher et al. |
| 7,663,534 B2 | 2/2010 | Hilsebecher et al. |
| 8,884,812 B2 | 11/2014 | Nagy |
| 9,411,043 B2* | 8/2016 | Ikeya .................... G01S 13/931 |
| 9,507,014 B2 | 11/2016 | Stelzer et al. |
| 9,784,829 B2* | 10/2017 | Zeng ....................... G01S 7/415 |
| 9,891,316 B2 | 2/2018 | Mizutani et al. |
| 10,274,593 B2* | 4/2019 | Liu ........................ G01S 13/726 |
| 2008/0012752 A1* | 1/2008 | Okamura .............. G01S 7/4026 342/165 |
| 2008/0266170 A1* | 10/2008 | Klotzbuecher ......... G01S 13/58 342/113 |
| 2012/0326914 A1 | 12/2012 | Nagy |
| 2014/0218227 A1* | 8/2014 | Stelzen ................... G01S 17/88 342/104 |

FOREIGN PATENT DOCUMENTS

| | | |
|---|---|---|
| JP | H 09-145833 A | 6/1997 |
| JP | H 09-288171 A | 11/1997 |
| JP | 2002-031686 A | 1/2002 |
| WO | WO 2004/029650 A1 | 4/2004 |
| WO | WO 2005/124391 A1 | 12/2005 |
| WO | WO 2006/051603 A1 | 5/2008 |
| WO | WO 2009/144435 A1 | 12/2009 |
| WO | WO 2014/123112 A1 | 8/2014 |

* cited by examiner

VEHICLE RADAR SYSTEM

CROSS-REFERENCE TO RELATED APPLICATIONS

This application is a 35 U.S.C. § 371 national phase application of PCT International Application No. PCT/EP2016/079270, filed Nov. 30, 2016, which claims the benefit of priority under 35 U.S.C. § 119 to European Patent Application No. 15197282.5, filed Dec. 1, 2015, the contents of which are incorporated herein by reference in their entirety.

FIELD OF THE INVENTION

The present disclosure relates to a vehicle radar system arranged to generate, transmit and receive reflected radar signals. The radar system is arranged to provide azimuth angle and radial velocity for a plurality of measurement points.

BACKGROUND

Many vehicle radar systems include radar transceivers that are arranged for generating radar signals that are transmitted, reflected and received by use of appropriate antennas included in the radar system. The radar signals may for example be in the form of FMCW (Frequency Modulated Continuous Wave) signals.

A problem which frequently occurs in the steering of vehicles is the difficulty in noticing objects in proximity to the vehicle which are located in a position not easily seen by the driver. A position such as this is conventionally known as the blind spot which for example typically is located in a direction of 90° to 170° from the direction of travel, both to the left and to the right of the motor vehicle. It is important for the driver of a vehicle to be alerted to the presence of objects in the blind spot, particularly when turning or changing lanes in a multi-lane road or highway.

For this purpose, vehicles have been equipped with radar systems that are arranged to detect the presence of an object in the blind spot and automatically produce a signal which alerts the driver of the vehicle to the presence of the obstacle. In order to achieve this, a radar system must be able to determine the relative velocity between the vehicle into which it is fitted and a potential obstacle in order to distinguish the obstacle from stationary objects.

The document U.S. Pat. No. 7,598,904 describes how a relative velocity between two objects; a host vehicle including a radar system and a target vehicle, is determined. The radial velocity and the azimuth angle between the direction of observation and the direction of movement of the host vehicle are determined for a large number of measurement points. The relative velocity is determined as an average of velocity components in a direction of driving.

However, distorting radar detections occur, such as from the wheels, which cause a bias on the calculated relative velocity. The relative movement from the wheels and tires are creating an additional Doppler effect that is not caused by the relative velocity difference between the host vehicle having the radar system and the target vehicle.

It is therefore desired to provide a vehicle radar system that is able to provide a more stable and reliable relative velocity difference between a host vehicle, having a radar system, and a target vehicle or other object.

The object of the present disclosure is thus to provide a vehicle radar system that is able to provide a more stable and reliable relative velocity difference between a host vehicle, having a radar system, and a target vehicle or other object.

This object is achieved by use of a vehicle radar system having at least one transceiver arrangement arranged to generate and transmit radar signals, and to receive reflected radar signals, where the transmitted radar signals have been reflected by one or more objects. The radar system is arranged to provide azimuth angle and radial velocity for a plurality of measurement points at the objects. The radar system is arranged to calculate a difference between a minimum radial velocity and maximum radial velocity for the measurement points for a plurality of azimuth angle intervals. The radar system is further arranged to select those azimuth angle intervals where the difference exceeds a certain threshold.

This object is also achieved by use of a method for a vehicle radar system, where the method includes:

Generating and transmitting radar signals.

Receiving reflected radar signals, where the transmitted radar signals have been reflected by one or more objects.

Providing azimuth angle and radial velocity for a plurality of measurement points at the objects.

Calculating a difference between a minimum radial velocity and maximum radial velocity for the measurement points for a plurality of azimuth angle intervals.

Selecting those azimuth angle intervals where the difference exceeds a certain threshold.

According to an example embodiment of the present invention, the radar system is arranged in a host vehicle and is arranged to calculate an estimation of a relative velocity in a certain direction between the host vehicle and another object. The radar system is arranged to omit the measurement points in the selected angle intervals when performing the calculation. Other examples are disclosed in this description.

A number of advantages are obtained by use of the present disclosure. Mainly, a vehicle radar system is provided that is able to provide a more stable and reliable relative velocity difference between a host vehicle, having a radar system, and a target vehicle or other object. In particular, additional Doppler that is not caused by the difference between a host velocity and a target velocity may be identified.

BRIEF DESCRIPTION OF THE DRAWINGS

The present disclosure will now be described more in detail with reference to the appended drawings, where.

DETAILED DESCRIPTION

Figure 1:
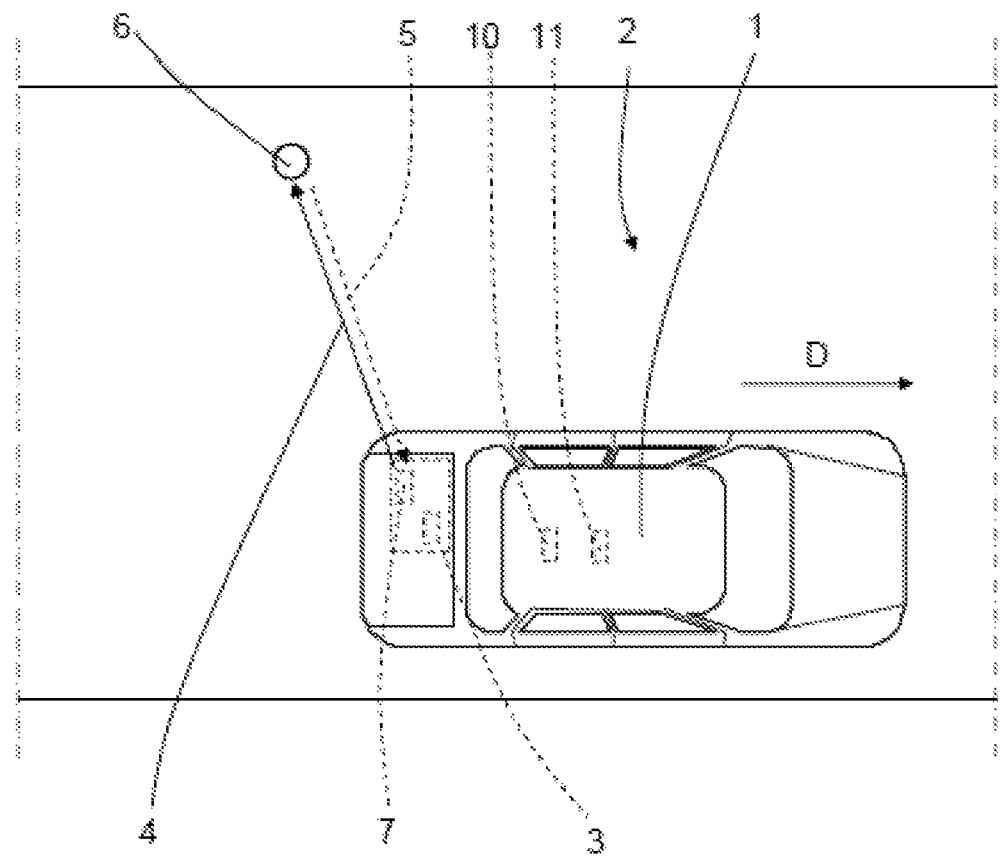
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4 and receiving reflected signals 5 and using a Doppler effect in a previously well-known manner. The vehicle radar system 3 thus includes a radar transceiver arrangement 7 and is arranged to provide azimuth angle θ and radial velocity $v_r$ of possible target objects 6 by simultaneously sampling and analyzing phase and amplitude of the received signals 5 by use of Doppler signal processing in a previously known manner. The distance to the target objects 6 is according to some aspect also acquired. The radar signals may for example be in the form of FMCW (Frequency Modulated Continuous Wave) Doppler signals operating at 77 GHz.

Figure 2:
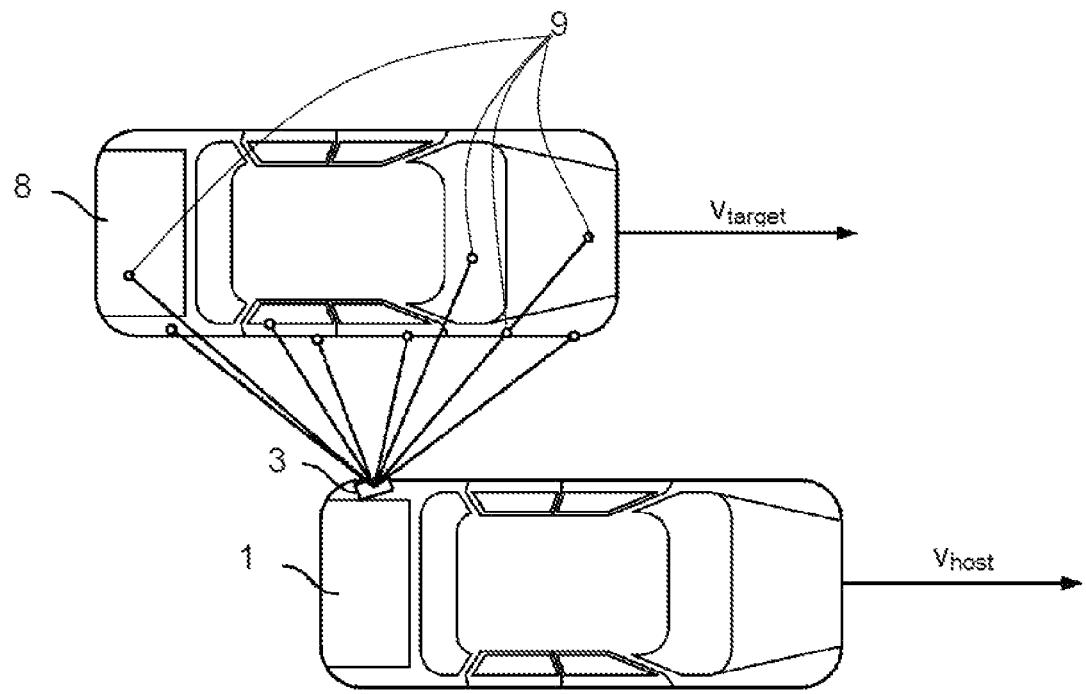
FIG. 2 shows a schematic top view of two vehicles.
Figure 3:
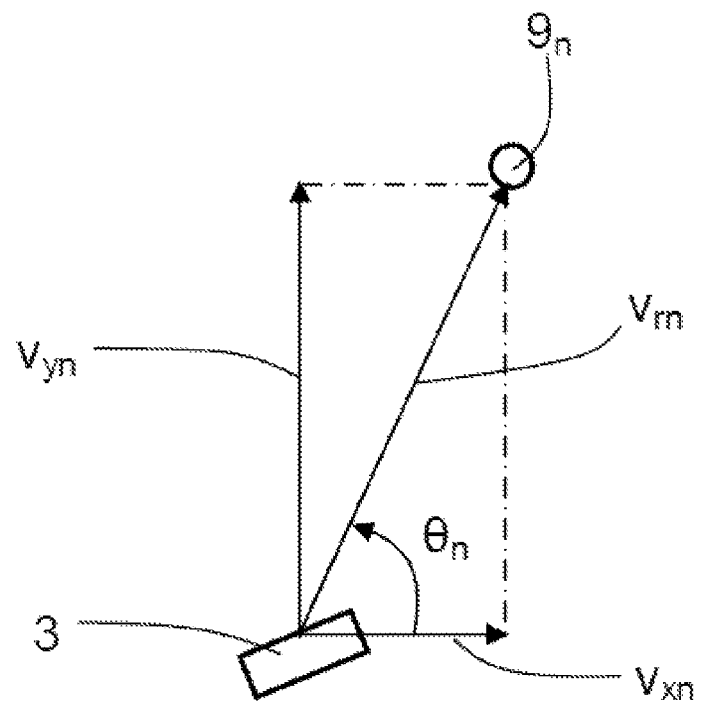
FIG. 3 shows radial velocity and azimuth angle for a certain measurement point.

As shown in FIG. 2, the vehicle 1 in question, the host vehicle 1, is running at a host velocity $v_{host}$ alongside a target vehicle 8 that is running at a target velocity $v_{target}$. By use of the vehicle radar system 3, the radial velocity and the azimuth angle between the direction of observation and the direction of movement of the host vehicle 1 are acquired for a large number of measurement points 9 (only a few indicated for reasons of clarity) where there is a total number N of measurements points. A radial velocity $v_{rn}$ and an azimuth angle $\theta_n$ between the direction of observation and the direction of movement of a certain measurement point $9_n$, being an n:th measurement point, n=1 . . . N, are indicated in FIG. 3.

In the following, the certain n:th measurement point $9_n$, n=1 . . . N, among all the measurement points 9 will be discussed.

The radial velocity $v_{rn}$ has an x-component $v_{xn}$ and a y-component $v_{yn}$, where the x-component $v_{xn}$ runs parallel to the direction D and the y-component $v_{yn}$ runs perpendicular to the x-component $v_{xn}$.

The radial velocity $v_{rn}$ is determined, for example, from the Doppler frequency and the Doppler phase shift. Information on the range may also be included for the measurement point $9_n$.

The desired differential velocity between the host vehicle 1 and the target vehicle 8 is:

$$\Delta V = V_{target} - V_{host} \qquad (1)$$

For the measurement point $9_n$, a radial velocity, $V_{rn}$ is calculated according to:

$$V_{rn} = \Delta V \cdot \cos(\theta_n) \qquad (2)$$

If it is assumed that the host vehicle 1 and the target vehicle 8 run substantially parallel to one another, the radial velocity $V_{rn}$ will not have a y-component $v_{yn}$ for the measurement point $9_n$, and the relative velocity for the measurement point $9_n$ corresponds respectively to the x-component $V_{xn}$.

The x-component $V_{xn}$ of the radial velocity $V_{rn}$ for the measurement point $9_n$ is calculated according to:

$$v_{xn} = \frac{v_m}{\cos(\theta_n)} \qquad (3)$$

An estimation $\Delta V'$ of the actual relative velocity $\Delta V$ can now be obtained by determining the average of the quotients according to equation (3). This can be written as:

$$\Delta V' = \frac{\overline{v_m}}{\cos(\theta_n)}, \qquad (4)$$

where $\overline{v_m}$ is the average of the radial velocity of all measurement points 9 calculated according to equation (2).

Figure 4:
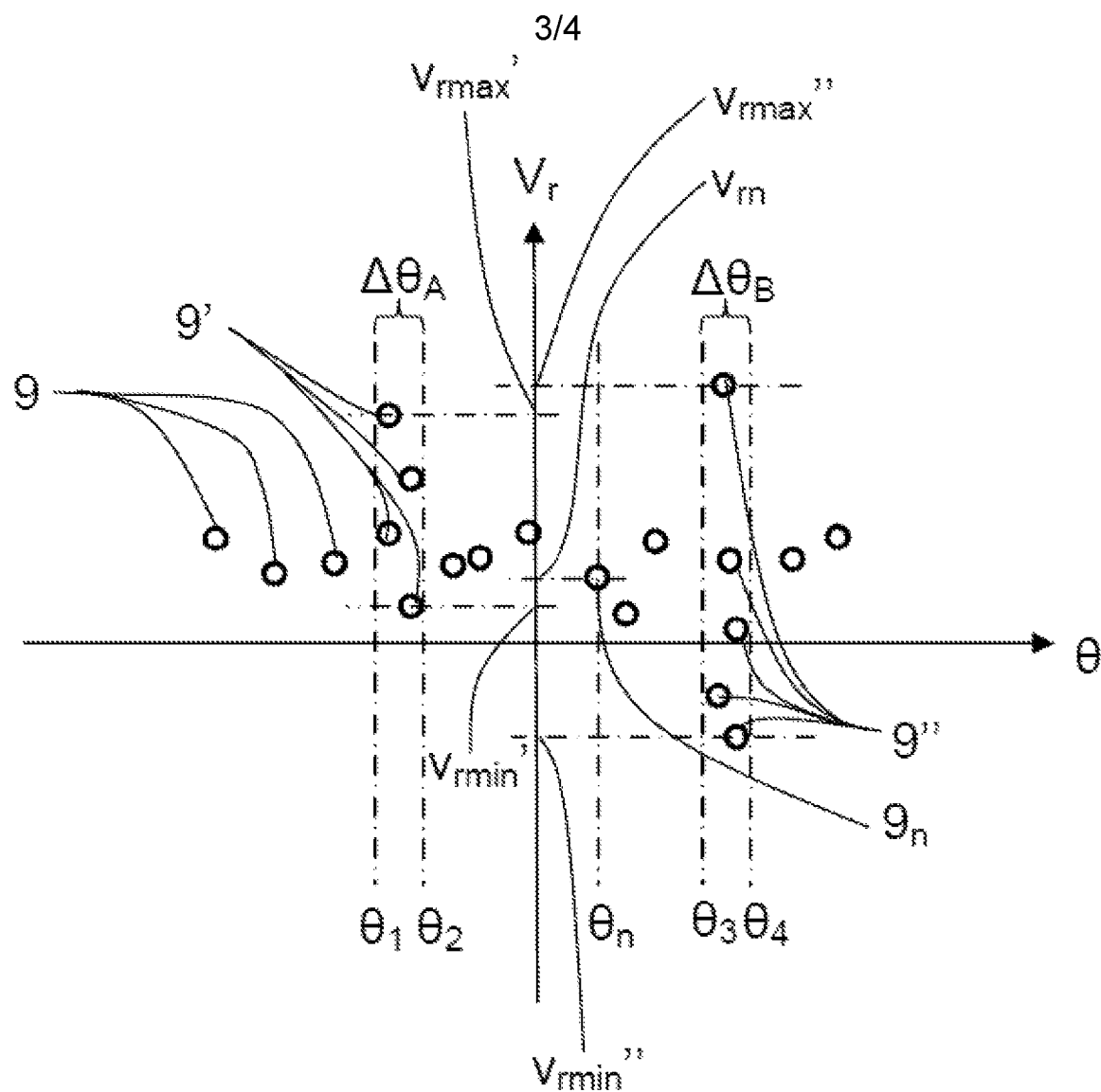
FIG. 4 shows detected radial velocity as a function of azimuth angle for all measurement points.

FIG. 4 shows the detected radial velocity $v_r$ as a function of the azimuth angle $\theta$ for all the measurement points 9. From FIG. 4, it follows that there is a first azimuth angle interval $\Delta\theta_A$ spanning from a first azimuth angle $\theta_1$ to a second azimuth angle $\theta_2$, and a second azimuth angle interval $\Delta\theta_B$ spanning from a third azimuth angle $\theta_3$ to a fourth azimuth angle $\theta_4$. In the first azimuth angle interval $\Delta\theta_A$ there is a first plurality of measurement points 9' among all the measurement points 9 that have a high Doppler spread, and in the second azimuth angle interval $\Delta\theta_B$ there is a second plurality of measurement points 9" among all the measurement points 9 that have a high Doppler spread. The certain measurement point $9_n$, being an n:th measurement point, n=1 . . . N, having a radial velocity $v_{rn}$ and a corresponding azimuth angle $\theta_n$ is indicated; this measurement point $9_n$ symbolizes any one of the measurement points 9.

According to embodiments of the present invention, the Doppler spread is estimated by calculating the difference between the minimum and maximum radial velocity $V_r$ for a plurality of azimuth angle intervals, and by selecting those azimuth angle intervals where this difference exceeds a certain threshold; in this way the azimuth angle intervals $\Delta\theta_A$, $\Delta\theta_B$ according to the above are found.

For the first azimuth angle interval $\Delta\theta_A$ there is a first difference between the minimum radial velocity $v_{rmin}'$ and the maximum radial velocity $v_{rmax}'$, and for the second azimuth angle interval $\Delta\theta_B$ there is a second difference between the minimum radial velocity $v_{rmin}''$ and the maximum radial velocity $v_{rmax}''$. In this example, both the first difference $v_{rmax}' - v_{rmin}'$ and the second difference $v_{rmax}'' - v_{rmin}''$ exceed the threshold. The measurement points 9', 9" in the first azimuth angle interval $\Delta\theta_A$ and in the second azimuth angle interval $\Delta\theta_B$ are not used for the estimation of the x-component $V_x$ of the radial velocity $V_r$.

The high Doppler spread is for example due to the fact that there is a relative movement from the wheels and tires of the target vehicle 8 are creating an additional Doppler signal that is not caused by the difference between the host velocity $v_{host}$ and the target velocity $v_{target}$.

As schematically indicated in FIG. 1, the vehicle 1 includes a safety control unit 10 and safety system 11, for example an emergency braking system and/or an alarm signal device. The safety control unit 10 is arranged to control the safety system 11 in dependence of input from the radar system 3.

Figure 5:
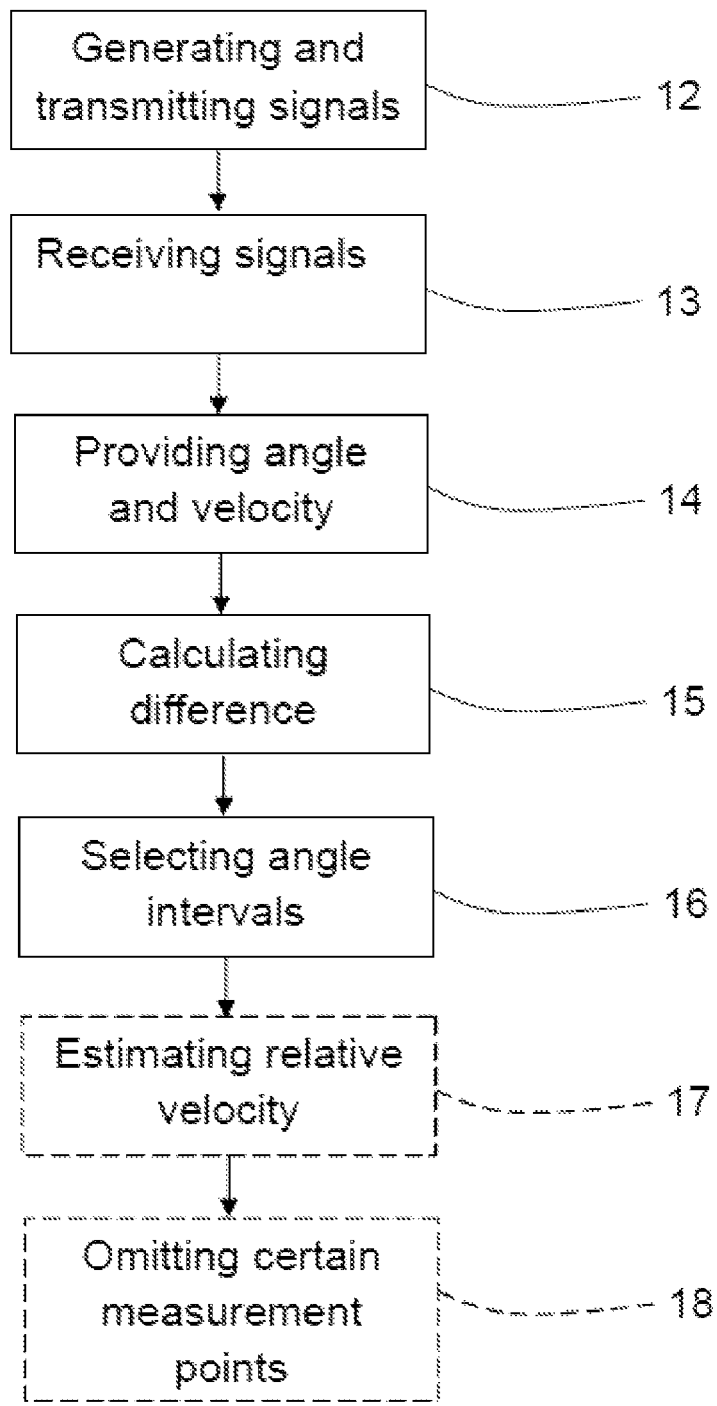
FIG. 5 shows a flowchart for methods according to the present disclosure.

With reference to FIG. 5, the present disclosure also relates to a method for a vehicle radar system, where the method includes the steps of:

Step 12: Generating and transmitting radar signals 4.

Step 13: Receiving reflected radar signals 5, where the transmitted radar signals 4 have been reflected by one or more objects 6 and 8.

Step 14: providing azimuth angle $\theta$ and radial velocity $v_r$ for each one of a plurality of measurement points 9 at the objects 6 and 8.

Step 15: Calculating a difference between a minimum radial velocity $V_{min}'$, $V_{rmin}''$ and maximum radial velocity $V_{max}'$, $V_{rmax}''$ for the measurement points 9 for a plurality of azimuth angle intervals.

Step 16: Selecting those azimuth angle intervals $\Delta\theta_A$, $\Delta\theta_B$ where the difference exceeds a certain threshold.

According to a further example embodiment, the method of the present invention also includes the steps of:

Step 17: Calculating an estimation of a relative velocity $\Delta V'$ in a certain direction between a host vehicle 1 and another object 8.

Step 18: Omitting the measurement points 9', 9" in the selected angle intervals $\Delta\theta_A$, $\Delta\theta_B$ when performing the calculation.

The present disclosure is not limited to the example embodiments described above, but may vary freely within the scope of the appended claims. For example, the radar system may be implemented in any type of vehicle such as cars, trucks and buses as well as boats and aircraft.

The radar transceiver 7 is adapted for any suitable type of Doppler radar in a Doppler radar system. There may be any number of radar transceivers 7 in the vehicle radar system 3, and they may be arranged for transmission and signals in any suitable direction. The plurality of sensing sectors or sensing bins may thus be directed in other desirable directions, such as rearwards or at the sides of the vehicle 1.

Radar signal processing is performed in any kind of suitable processor arrangement includes in the vehicle radar system 3, such as a DSP (Digital Signal Processor) or an RCU (Radar Control Unit) which according to some aspects includes a DSP.

The direction of the relative velocity ΔV that is desired has been shown to coincide with the running direction of the vehicles 1 and 8. However, the direction of the relative velocity ΔV that is desired may have any suitable direction. According to an aspect, the target vehicle is constituted by any suitable object 6 and 8.

The present disclosure describes how undesired effects of additional Doppler spread are avoided, and this can according to some aspects be used for other applications than for determining relative speed between a target vehicle and another object. Generally, the present disclosure can be applied to all applications that need a relative object velocity for objects that are perpendicular to the system vehicle.

For example, free space detection is only concerned about stationary objects. Such a classification, if something perpendicular is stationary or self-moving, can be made by use of the present disclosure.

Other applications like LDW (Lane Departure Warning) or LCA (Lane Change Assist) that are following objects that are on the next lane can also use the present disclosure to estimate the correct object velocity for a perpendicular object.

Generally, the present disclosure further relates to a vehicle radar system 3 including at least one transceiver arrangement 7 arranged to generate and transmit radar signals 4, and to receive reflected radar signals 5, where the transmitted radar signals 4 have been reflected by one or more objects 6 and 8, where the radar system 3 is arranged to provide azimuth angle θ and radial velocity $v_r$ for a plurality of measurement points 9 at the objects 6 and 8. The radar system 3 is arranged to calculate a difference between a minimum radial velocity $V_{min}'$, $V_{rmin}''$ and maximum radial velocity $V_{max}'$, $V_{rmax}''$ for the measurement points 9 for a plurality of azimuth angle intervals, and to select those azimuth angle intervals $\Delta\theta_A$, $\Delta\theta_B$ where the difference exceeds a certain threshold.

According to an example embodiment of the present invention, the radar system 3 is arranged in a host vehicle 1 and is arranged to calculate an estimation of a relative velocity ΔV' in a certain direction between the host vehicle 1 and another object 8, where the radar system 3 is arranged to omit the measurement points 9', 9'' in the selected angle intervals $\Delta\theta_A$, $\Delta\theta_B$ when performing the calculation.

According to an example embodiment, the radar system 3 is arranged to only take an x-component $V_{xn}$ of the radial velocity $V_{rn}$ into account when the radial velocity $V_{rn}$ is determined.

Generally, the present disclosure also relates to a method for a vehicle radar system, where the method includes the steps of:

Step 12: generating and transmitting radar signals 4;

Step 13: receiving reflected radar signals 5, where the transmitted radar signals 4 have been reflected by one or more objects 6 and 8;

Step 14: providing azimuth angle θ and radial velocity $v_r$ for a plurality of measurement points 9 at the objects 6 and 8;

Step 15: calculating a difference between a minimum radial velocity $V_{min}'$, $V_{rmin}''$ and maximum radial velocity $V_{max}'$, $V_{rmax}''$ for the measurement points 9 for a plurality of azimuth angle intervals; and Step 16: selecting those azimuth angle intervals $\Delta\theta_A$, $\Delta\theta_B$ where the difference exceeds a certain threshold.

According to a further example embodiment, the method includes:

Step 17: calculating an estimation of a relative velocity ΔV' in a certain direction between a host vehicle 1 and another object 8; and Step 18: omitting the measurement points 9', 9'' in the selected angle intervals $\Delta\theta_A$, $\Delta\theta_B$ when performing the calculation.

According to a further example embodiment, the method includes only taking an x-component $V_{xn}$ of the radial velocity $V_{rn}$ into account when the radial velocity $V_{rn}$ is determined.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising, at least one transceiver arrangement arranged in a host vehicle and configured to generate and transmit radar signals, and to receive reflected radar signals, where the transmitted radar signals have been reflected by one or more objects, where the radar system is arranged to provide an azimuth angle and a radial velocity for a plurality of measurement points at the objects, the radar system includes a processor configured to calculate a difference between a minimum radial velocity and a maximum radial velocity for the measurement points for a plurality of azimuth angle intervals, and to calculate an estimation of a relative velocity between the host vehicle and the one or more objects using the azimuth angle and the radial velocity for each of the measurement points, except for those of the measurement points corresponding to azimuth angle intervals where the difference between the minimum radial velocity and the maximum radial velocity exceeds a certain threshold.

2. The vehicle radar system according to claim 1, wherein the radial velocity for each of the plurality of measurement points includes an x-component that runs parallel to a direction of travel of the host vehicle, and a y-component perpendicular to the x-component, and wherein the radial velocity provided by the radar system for each of the plurality of measurement points includes only the x-component thereof.

3. A method for a vehicle radar system, where the method comprises the steps of:

generating and transmitting radar signals by at least one transceiver arrangement in a host vehicle;

receiving, by the at least one transceiver arrangement, reflected radar signals, where the transmitted radar signals have been reflected by one or more objects;

providing to a processor, by the vehicle radar system, azimuth angle and radial velocity for a plurality of measurement points at the objects;

calculating, by the processor, a difference between a minimum radial velocity and a maximum radial velocity for the measurement points for a plurality of azimuth angle intervals; and calculating, by the processor, an estimation of a relative velocity between the host vehicle and the one or more objects using the azimuth angle and the radial velocity for each of the measurement points, except for those of the measurement points corresponding to azimuth angle intervals where the difference between the minimum radial velocity and the maximum radial velocity exceeds a certain threshold.

4. The method according to claim 3, wherein the radial velocity for each of the plurality of measurement points includes an x-component that runs parallel to a direction of travel of the host vehicle, and a y-component perpendicular to the x-component, and wherein the radial velocity provided by the radar system for each of the plurality of measurement points includes only the x-component thereof.

\* \* \* \* \*